(12) United States Patent
Goyal

(10) Patent No.: US 10,323,951 B2
(45) Date of Patent: Jun. 18, 2019

(54) METHOD OF GENERATING A NAVIGATION-BASED ROUTE FOR A VEHICLE

(71) Applicant: GENERAL MOTORS LLC, Detroit, MI (US)

(72) Inventor: Anurag Goyal, Plymouth, MI (US)

(73) Assignee: General Motors LLC, Detroit, MI (US)

( * ) Notice: Subject to any disclaimer, the term of this patent is extended or adjusted under 35 U.S.C. 154(b) by 58 days.

(21) Appl. No.: 15/593,288

(22) Filed: May 11, 2017

(65) Prior Publication Data

US 2018/0328749 A1 Nov. 15, 2018

(51) Int. Cl.
  *G01C 21/34* (2006.01)
  *G01C 21/36* (2006.01)

(52) U.S. Cl.
  CPC ....... *G01C 21/3461* (2013.01); *G01C 21/367* (2013.01); *G01C 21/3617* (2013.01)

(58) Field of Classification Search
  CPC ........... G01C 21/3461; G01C 21/3617; G01C 21/367
  See application file for complete search history.

(56) References Cited

U.S. PATENT DOCUMENTS

| | | | |
|---|---|---|---|
| 2016/0138925 A1* | 5/2016 | Takahashi | B60L 11/1809 701/533 |
| 2017/0076600 A1* | 3/2017 | Scofield | G08G 1/0112 |

* cited by examiner

*Primary Examiner* — Nga X Nguyen
(74) *Attorney, Agent, or Firm* — Reising Ethington P.C.; David Willoughby

(57) ABSTRACT

A method of generating a navigation-based route for a vehicle. The method includes: determining route information from a starting point to a destination using a navigation unit associated with the vehicle, wherein the route information includes one or more route segments; determining that one or more of the route segments wholly or partially overlap a toll zone; obtaining traffic information for at least some of the route segments ahead of the vehicle; and when the traffic information indicates that there is a route that avoids the toll zone without a traffic delay, then generating the route to avoid the toll zone.

18 Claims, 3 Drawing Sheets

METHOD OF GENERATING A NAVIGATION-BASED ROUTE FOR A VEHICLE

INTRODUCTION

The technical field relates to vehicles and, more particularly, to vehicle navigation units and methods for generating navigation-based routes.

Navigation units for vehicles typically include a user-configurable setting which allows a user to choose between toll routes and non-toll routes. Oftentimes, toll routes are faster than non-toll routes, particularly during high traffic times. However, during certain traffic conditions, non-toll routes may be as fast, or faster than, toll routes. In these circumstances, if the navigation unit is set to suggest toll routes, the system may accordingly suggest a toll route to the user. It may be desirable in these instances to provide a non-toll route, even though the navigation unit typically defaults to generating toll routes.

SUMMARY

According to an embodiment, there is provided a method of generating a navigation-based route for a vehicle. The method involves determining route information from a starting point to a destination using a navigation unit associated with the vehicle. The route information includes one or more route segments. The method further includes determining that one or more of the route segments wholly or partially overlap a toll zone, and obtaining traffic information for at least some of the route segments ahead of the vehicle. When the traffic information indicates that there is a route that avoids the toll zone without a traffic delay, the method involves generating the route to avoid the toll zone.

In a more particular embodiment, the traffic information is specific to one or more of the route segments within the toll zone and to one or more of the route segments in a non-toll zone.

In another more particular embodiment, the toll zone is a toll lane and the non-toll zone is a non-toll lane, and the generating step includes generating the route to direct the vehicle to the non-toll lane to avoid the toll zone when the traffic information indicates that the toll zone can be avoided without a traffic delay.

In another more particular embodiment, the traffic information includes a traffic density indication, and the traffic information indicates that the toll zone can be avoided without a traffic delay when the traffic density indication represents light traffic.

In another more particular embodiment, the traffic density information is a color-coded scheme and a color that represents light traffic densities indicates that the toll zone can be avoided without a traffic delay.

In another more particular embodiment, the traffic information includes speeds of a plurality of vehicles in the route segments that wholly or partially overlap the toll zone, and the traffic information indicates that the toll zone can be avoided without a traffic delay if the speeds of the plurality of vehicles are comparable to a speed limit of a road in the route segments that wholly or partially overlap the toll zone.

In another more particular embodiment, the traffic information includes relative speeds of a plurality of vehicles in a plurality of lanes in the route segments that wholly or partially overlap the toll zone, and the traffic information indicates that the toll zone can be avoided without a traffic delay if the relative speeds of the plurality of vehicles indicate that one or more of the plurality of lanes that represent the toll zone has traffic moving as fast or faster than traffic in one or more of the plurality of lanes that represent a corresponding non-toll zone.

In another more particular embodiment, the traffic information includes an indication of one or more road hazards along the route, and the traffic information indicates there is a traffic delay if one or more road hazards are present at or before the one or more route segments ahead of the vehicle along the route which wholly or partially overlap the toll zone.

In another more particular embodiment, the indication of one or more road hazards is lane specific, and the toll zone is a toll lane, and the generating step includes generating the route to include a non-toll lane if the one or more road hazards are located in the toll lane.

In another more particular embodiment, the step of obtaining traffic information includes obtaining traffic information for one or more of the route segments ahead of the vehicle for any possible alternative routes, and for one or more of the route segments ahead of the vehicle, when the traffic information indicates that the toll zone can be avoided without a traffic delay, generating an alternative route when the route segments ahead of the vehicle for the alternative route have less of a traffic delay than the routes including the toll zone and a corresponding non-toll zone.

In another more particular embodiment, the starting point is a current position of the vehicle and the destination is a point ahead of the vehicle based on a current trajectory of the vehicle.

In another more particular embodiment, the method includes updating traffic information for the route segment that wholly or partially overlaps the toll zone in real-time.

In a more particular embodiment, the navigation unit is embedded in the vehicle and includes a user-configurable selection indicating that the route may include toll zones.

According to another embodiment, there is provided a method of generating a navigation-based route for a vehicle. The method involves determining route information at a navigation unit associated with the vehicle. The route information includes a route from a starting point to a destination divided into one or more route segments. The method further involves determining whether to use toll routes via a user-configurable selection, and when it is determined to use toll routes via the user-configurable selection, determining whether one or more of the route segments wholly or partially overlap a toll zone. When it is determined that one or more of the route segments wholly or partially overlap a toll zone, the method involves obtaining traffic information for the route segment that wholly or partially overlaps the toll zone and analyzing map data from the navigation unit to determine whether a corresponding non-toll zone is present. When a corresponding non-toll zone is present, the method involves obtaining traffic information for the route segment that wholly or partially overlaps the non-toll zone, and generating the route to direct the vehicle to the corresponding non-toll zone when the traffic information of the route segment that wholly or partially overlaps the toll zone indicates that a traffic level for the non-toll zone is comparable to a traffic level for the toll zone In a more particular embodiment, the step of obtaining traffic information for the route segment that wholly or partially overlaps the toll zone includes lane-specific traffic information.

In another more particular embodiment, the toll zone is a toll lane and the non-toll zone is a non-toll lane, and the generating step includes generating the route to direct the vehicle to the non-toll lane.

In another more particular embodiment, the step of analyzing the map data from the navigation unit includes receiving, or ascertaining that there is, an indicator of a toll lane and an indicator of a non-toll lane to determine whether a corresponding non-toll zone present.

In another more particular embodiment, the generating step includes generating the route to include the non-toll lane when the traffic information of the route segment that wholly or partially overlaps the toll zone indicates that the toll zone can be avoided without a traffic delay.

According to another embodiment, there is provided a method of generating a navigation-based route for a vehicle. The method includes the step of determining route information at a navigation unit associated with the vehicle, wherein the route information includes a route from a starting point to a destination divided into one or more route segments. The method further includes the step of determining whether to use toll routes or to use non-toll routes via a user-configurable selection. When it is determined to use non-toll routes via the user-configurable selection, the method involves generating the route to direct the vehicle through a non-toll zone. When it is determined to use toll routes via the user-configurable selection, the method involves determining whether one or more of the route segments wholly or partially overlap a toll zone. When it is determined that one or more of the route segments wholly or partially overlap a toll zone, the method involves obtaining traffic information for the one or more of the route segments that wholly or partially overlap the toll zone and analyzing map data from the navigation unit to determine whether a corresponding non-toll zone is present. When it is determined that a corresponding non-toll zone is present, the method involves obtaining traffic information for one or more of the route segments that include the non-toll zone and generating the route to direct the vehicle to the corresponding non-toll zone when the traffic information for the one or more route segments that include the non-toll zone and for the one or more of the route segments that wholly or partially overlap the toll zone indicate that the toll zone can be avoided without a traffic delay, and when the traffic information for the one or more route segments that include the non-toll zone and for the one or more of the route segments that wholly or partially overlap the toll zone indicate that avoiding the toll zone will incur a traffic delay, the method involves generating the route to direct the vehicle to the toll zone. When it is determined that a corresponding non-toll zone is not present, the method involves generating the route to direct the vehicle to the toll zone.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The methods described below may be used to generate a navigation-based route for a vehicle. Typically, vehicle navigation units can have a toll routes setting and a non-toll routes setting. With the toll routes setting, routes are usually chosen to direct the vehicle through toll zones. Oftentimes, routes through toll zones are faster than routes through non-toll zones, especially with certain traffic conditions, such as peak traffic times, to cite one example. However, with other traffic conditions, such as those that indicate low traffic density, for example, routes through non-toll zones may be just as fast, or faster than, routes through toll zones. In such situations, it may be desirable to adjust the settings of the navigation unit so that routes are generated to direct the vehicle to a corresponding non-toll zone when the traffic information indicates that the toll zone can be avoided without a traffic delay. Generating the routes or altering the toll routes setting based at least partially on the traffic information can save users money by avoiding toll routes in such situations.

The traffic information collected and used to determine whether toll zones should be avoided can include information from sources external to the vehicle or internal to the vehicle. For example, traffic information could be obtained from a call center, a navigation unit internal to the vehicle, a navigation unit on a user's mobile device, a vehicle system module such as a vehicle-to-vehicle communication system or infotainment system, one or more vehicle sensors, or any other conceivable source. The traffic information may include traffic densities, which may, in some embodiments, be a color representation (green, yellow, or red) of light, moderate, and heavy traffic. The traffic information may further include indication of one or more road hazards, which could be lane-specific. Road hazards may include accidents, objects on the road, construction, or any other hazard that may indicate there could be a traffic delay. Traffic information may also include data provided via a vehicle-to-vehicle communications module, including but not limited to, speeds of vehicles in a particular vicinity, a determination of which lanes are moving faster based on relative speeds of other vehicles, etc. Other types of traffic information are certainly possible.

Communications System—

Figure 1:
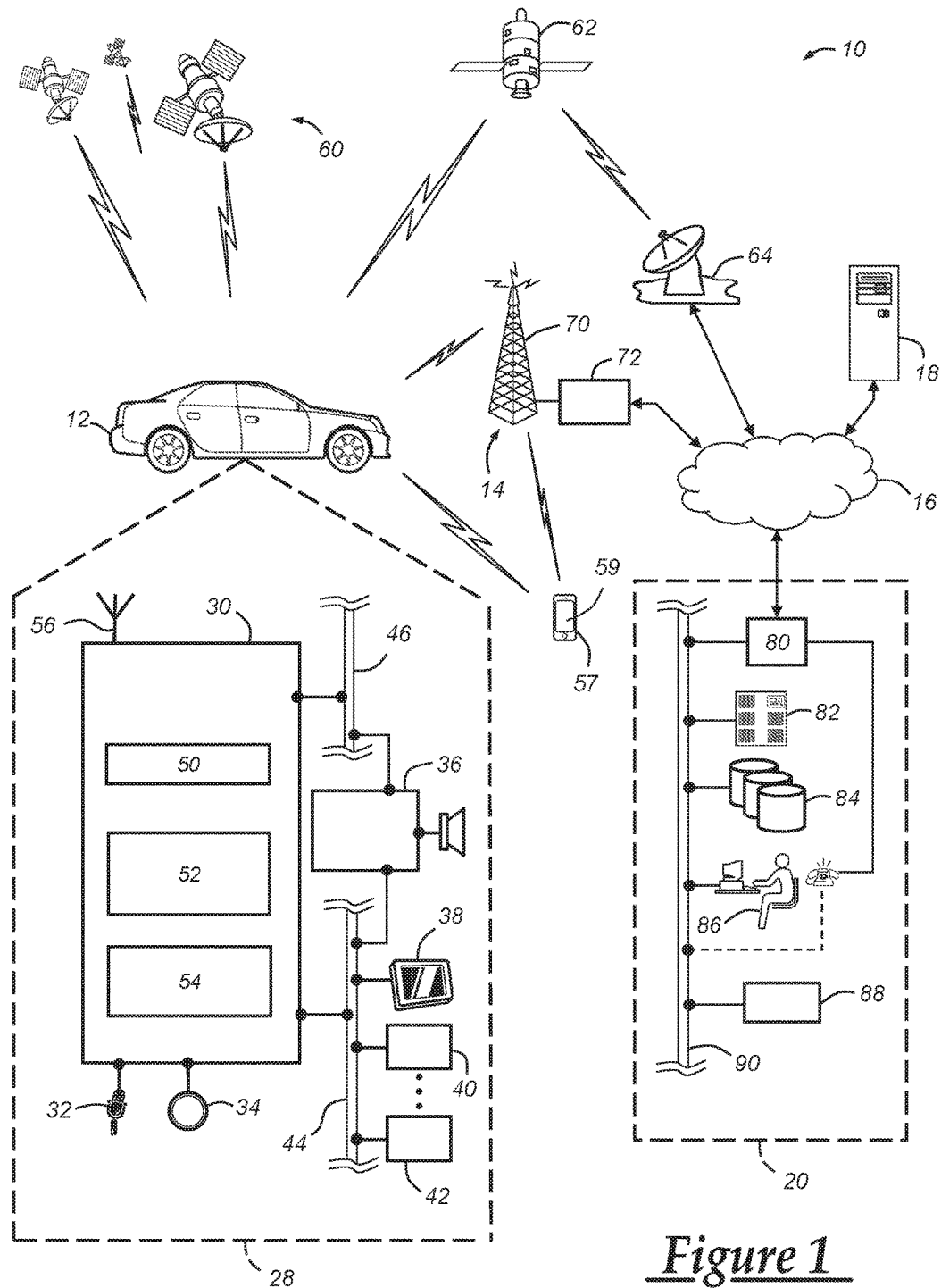
FIG. 1 is a block diagram depicting an embodiment of a communications system that is capable of utilizing the methods disclosed herein.

With reference to FIG. 1, there is shown an operating environment that comprises a mobile vehicle communications system 10 that can be used to implement the methods disclosed herein. Communications system 10 generally includes a vehicle 12, one or more wireless carrier systems 14, a land communications network 16, a computer 18, and a call center 20. It should be understood that the disclosed methods can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1 and can include a telematics unit 30, a microphone 32, one or more pushbuttons or other control inputs 34, an audio system 36, a visual display 38, and a navigation unit 40 as well as a number of other vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is itself a vehicle system module (VSM) and can be implemented as an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, a navigation unit that is associated with the vehicle (such as an app on a user's phone), or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a voice response unit at the call center 20) and data communication (e.g., to provide GPS location data to the call center 20), the system can utilize a single call over a voice channel and switch as needed between voice and data transmission over the voice channel, and this can be done using techniques known to those skilled in the art.

One of the networked devices that can communicate with the telematics unit 30 is a wireless device, such as a mobile device 57. The mobile device 57 can include computer processing capability, a transceiver capable of communicating using a short-range wireless protocol, and a visual mobile device display 59. In some implementations, the mobile device display 59 also includes a touch-screen graphical user interface and/or a navigation unit capable of receiving GPS satellite signals and generating GPS coordinates based on those signals. The mobile device 57 also includes one or more microprocessors that execute machine code to generate logical output. Examples of the mobile device 57 include the iPhone manufactured by Apple and the Galaxy manufactured by Samsung, as well as others. While the mobile device 57 may include the ability to communicate via cellular communications using the wireless carrier system 14, this is not always the case. For instance, Apple manufactures devices such as the various models of the iPad and iPod Touch that include the processing capability, the display 59, and the ability to communicate over a short-range wireless communication link. However, the iPod Touch™ and some iPads™ do not have cellular communication capabilities. Even so, these and other similar devices may be used or considered a type of mobile device for the purposes of the method described herein.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth™, or near field communication (NFC). When used for packet-switched data communication such as TCP/IP, the telematics unit can be configured with a static IP address or can be set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30, or it can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the methods discussed herein.

Telematics unit 30 can be used to provide a diverse range of vehicle services that involve wireless communication to and/or from the vehicle. Such services include: turn-by-turn directions and other navigation-related services that are provided in conjunction with the navigation unit 40; receipt of traffic information for use with the navigation unit 40; diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

Navigation unit 40 receives radio signals from a constellation 60 of GPS satellites. From these signals, the navigation unit 40 can determine a vehicle position that is used for providing navigation and other position-related services to the vehicle user. Navigation information can be presented on the display 38 (or other display within the vehicle) or can be presented verbally such as is done when supplying turn-by-turn navigation. The navigation services can be provided using a dedicated in-vehicle, embedded navigation unit (which can be part of navigation unit 40); some or all navigation services can be done via telematics unit 30, wherein the position information is sent to a remote location for purposes of providing the vehicle with navigation maps, map annotations (points of interest, restaurants, etc.), route calculations, and the like; or if the navigation unit is integrated with a mobile device 57, it could possibly be accessible to a vehicle user through the telematics unit. The position information can be supplied to call center 20 or other remote computer system, such as computer 18, for other purposes, such as fleet management. Also, new or updated map data can be downloaded to the navigation unit 40 from the call center 20 or other third-party source via the telematics unit 30, depending on the particular embodiment.

Figure 2:
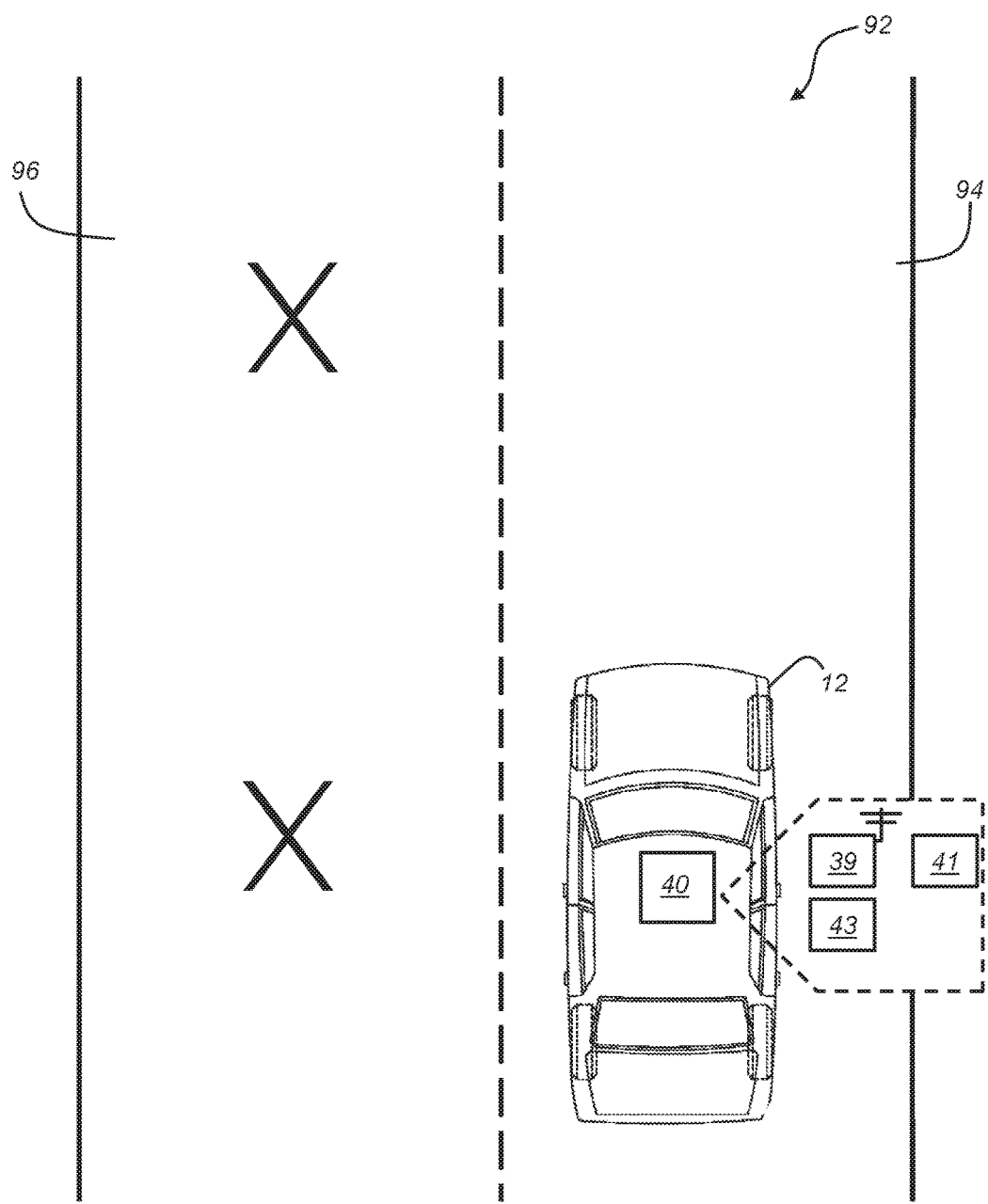
FIG. 2 is a block diagram depicting a portion of the communications system shown in FIG. 1 and an embodiment of a vehicle traveling in a non-toll zone near a toll zone.

As shown in FIG. 2, the navigation unit 40 may comprise a GPS chipset 39, as well as a dedicated processor 41 and memory 43. The GPS chipset 39 may adapted to receive one or more GPS signals; e.g., in at least one implementation, the chipset 39 may be adapted in some embodiments to receive at least four GPS signals simultaneously. The processor 41 and memory 43 may be adapted to perform calculations associated with the received GPS signals—e.g., to determine location data associated with the vehicle 12—and to communicate with other vehicle system modules 42. In at least one embodiment, the processor 41 and memory 43 may have similar physical characteristics and features as that of processor 52 and memory 54; however, of course, the processor 41 and memory 43 may be adapted and/or configured (e.g., via software, firmware, or the like) to perform or execute tasks, routines, programs, or any combination thereof associated with the navigation unit 40 (i.e., rather than the telematics unit 30). In other embodiments, execution of at least some navigation unit tasks, routines, programs. etc. occurs at the telematics unit 30 or the mobile device 57. And in at least one implementation, the navigation unit 40 does not include a dedicated processor 41 or memory 43; e.g., the call center 20, the telematics unit 30, the mobile device 57, or other VSM 42 performs processing and data storage functions.

Returning to FIG. 1, apart from the telematics unit 30, audio system 36, and GPS module 40, the vehicle 12 can include other vehicle system modules (VSMs) 42 in the form of electronic hardware components that are located throughout the vehicle and typically receive input from one or more sensors and use the sensed input to perform monitoring, control, reporting and/or other functions. The term VSM can be considered to have a similar meaning as vehicle sensor. Each of the VSMs 42 is preferably connected by communications bus 44 to the other VSMs, as well as to the telematics unit 30, and can be programmed to run various vehicle systems and subsystems. As examples, one VSM 42 can be an engine control module (ECM) that controls various aspects of engine operation such as fuel ignition and ignition timing, another VSM 42 can be a powertrain control module that regulates operation of one or more components of the vehicle powertrain, another VSM 42 can be a vehicle-to-vehicle communication module which is configured to relay information between one or more vehicles. As is appreciated by those skilled in the art, the above-mentioned VSMs are only examples of some of the modules that may be used in vehicle 12, as numerous others are also possible.

Vehicle electronics 28 include a number of vehicle user interfaces that provide vehicle occupants with a means of providing and/or receiving information, including microphone 32, pushbutton(s) 34, audio system 36, and visual display 38. As used herein, the term 'vehicle user interface' broadly includes any suitable form of electronic device, including both hardware and software components, which is located on or in the vehicle and enables a vehicle user to communicate with or through a component of the vehicle. Microphone 32 provides audio input to the telematics unit to enable the driver or other occupant to provide voice commands and carry out hands-free calling, navigation prompts, etc., via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Audio system 36 provides audio output to a vehicle occupant and can be a dedicated, stand-alone system or part of the primary vehicle audio or infotainment system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000 or 1×EV-DO) or GSM/GPRS (e.g., 4G LTE). As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (traffic, news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 includes an electronic processor and computer-readable memory accessible by the processor for such things as data and computer program storage. The computer 18 can be used for one or more purposes, such as a web server accessible by the vehicle via telematics unit 30 and wireless carrier 14. Other such accessible computers 18 can be, for example: a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 3:
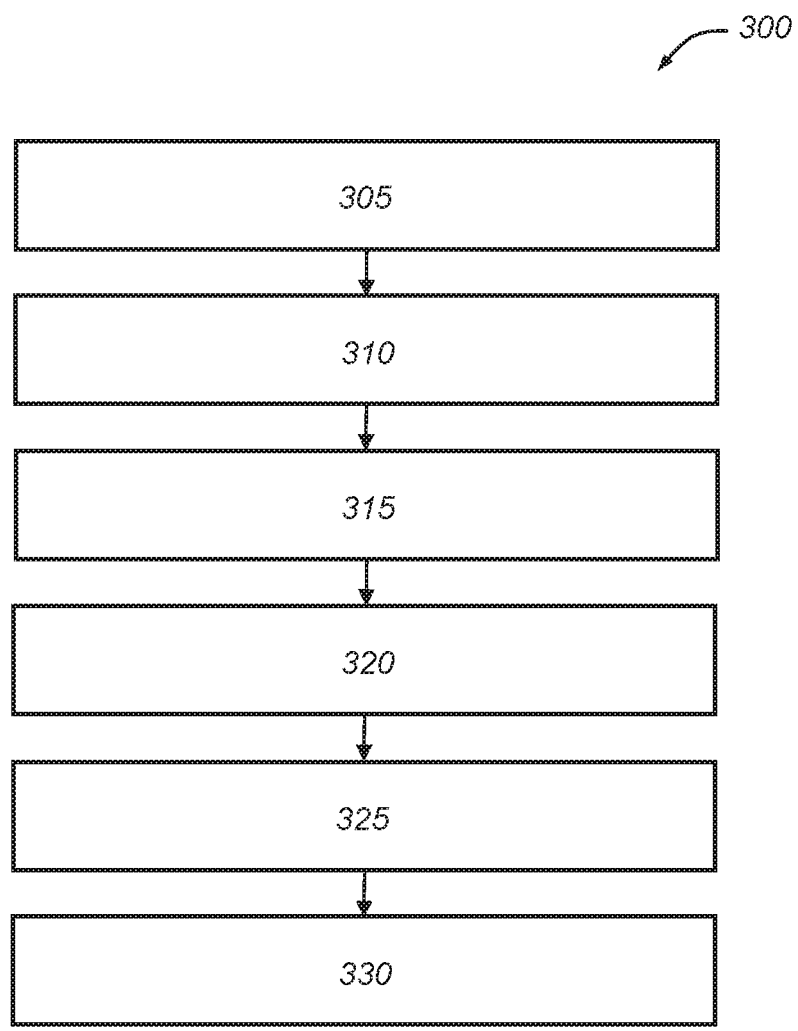
FIG. 3 is a flow chart depicting an embodiment of a method of generating a navigation-based route for a vehicle.

Turning now to FIG. 3, there is shown an exemplary implementation of a method 300 of generating a navigation-based route for a vehicle. The method 300 may be implemented using the communication system 10 of FIG. 1 and navigation unit 40 of FIG. 2; for example, by carrying out various steps using the call center 20, navigation unit 40, and/or mobile device 57. The method 300 may be used to provide a route to the vehicle 12 via the navigation unit 40 that avoids toll roads, thereby saving a vehicle user money, in situations where a default setting of the navigation unit 40 is set to direct the vehicle onto toll roads.

The method begins at step 305 with determining route information at the navigation unit 40 associated with the vehicle 12. In an exemplary implementation, the navigation unit 40 is embedded in the vehicle 12 as shown in FIGS. 1 and 2; however, other navigation units may be associated with the vehicle 12 as well, such as those embedded in or otherwise ran through mobile device 57. The route information includes a route from a starting point to a destination divided into one or more route segments. The starting point and/or destination may be input by the user, derived from a current position of the vehicle 12, or ascertained by the navigation unit 40 or another VSM 42 based on routes typically taken, to cite a few examples. In another example, the starting point may be the current position of the vehicle and the destination could be a point ahead of the vehicle given the vehicle's general trajectory, in situations where route guidance is not explicitly requested by the user. In such situations, the vehicle 12 can display or prompt the user to take better lanes or another route. A user-configurable setting can be included on the vehicle for the user to enable or disable such a feature.

The route includes one or more route segments. For example, shorter distances between the starting point and the destination may only include one route segment, whereas longer distances between the starting point and the destination may include a plurality of route segments (e.g., a trip from Michigan to Florida may be divided into thousands of route segments, to cite one example). The route information may be updated in real-time, or there may be some delay. Also, the route information may be updated on a conditional-basis, such as when traffic information changes. For example, if there is a hazard in a route segment that the vehicle has not arrived at yet, the route segments before the hazard may be reanalyzed or changed to account for the upcoming route segment with the hazard. Any operable update scheme for the map data and route information is certainly possible.

Step 310 involves determining whether to use toll routes. Typically, the navigation unit 40 is configured to default to toll routes, as there are many instances when toll routes are quicker than non-toll routes. For example, as depicted in FIG. 2, a road 92 can include one or more non-toll lanes 94 with adjoining or nearby toll lanes 96. During peak traffic times, the non-toll lane 94 may have more traffic and a higher delay than the toll lane 96. Accordingly, the navigation unit 40 may prompt the user of vehicle 12 to "stay to the left," since the system is configured to default to toll routes. The navigation unit 40 may include a user-configurable selection that allows a user to choose between toll routes and non-toll routes. In a non-toll routes default setting, the navigation unit 40 will avoid toll routes, and accordingly, will prompt the user of vehicle 12 to "stay to the right." However, the method 300 can generate a non-toll route even when the toll routes setting is selected. For example, if the toll lane 96 can be avoided without a traffic delay, the navigation unit 40 will prompt the user of vehicle 12 to "stay to the right," routing the vehicle onto non-toll lane 94, despite the fact that toll zones are preferred or defaulted to in this setting.

Step 315 involves determining whether one or more route segments wholly or partially overlap a toll zone. Determining whether one or more route segments wholly or partially overlap a toll zone may involve analyzing the navigation unit 40 map data. Toll zones may include specific lanes on a road, such as the toll zone or lane 96 on the road 92 of FIG. 2. Toll zones may include entirely separate or partially separate tollways, such as a turnpike off of a main highway. Toll zones may also include bridges, tunnels, ferries, mountain passes, or any other fee-based transportation route.

At step 320, map data is analyzed to determine whether a corresponding non-toll zone is present. Since the method 300 can direct users to a corresponding non-toll zone when the navigation unit 40 is set to direct users to toll zones, at step 320, the map data can be used to determine if a corresponding non-toll zone is present. For example, there may be instances where there is no corresponding non-toll zone, such as when the only route to an island is via a ferry. In such instances, the method 300 may generate a route directing the vehicle to the toll zone. A corresponding non-toll zone may include a free lane, such as lane 94 near toll lane 96 as shown in FIG. 2. A corresponding non-toll zone may also include separate roads, throughways, etc., that are generally near the toll zone. For example, toll lanes may run separately from the regular lanes (e.g., not physically continuous parallel lanes). If the distance or speed of travel along the route is comparable in a non-toll zone as compared to the toll zone, then such a lane, road, throughway, etc., may be considered a corresponding non-toll zone (e.g., travel via the non-toll zone is within 2 miles of travel via the toll zone). If there is a corresponding non-toll zone, then the method may continue to step 325.

Step 325 involves obtaining traffic information. As previously described, the traffic information can be obtained from sources external to the vehicle 12 or internal to the vehicle 12. For example, traffic information could be obtained from the call center 20, a navigation unit 40 embedded in the vehicle or on a user's mobile device 57, a vehicle system module 42 such as a vehicle-to-vehicle communication system, an infotainment system such as through Sirius XM™ radio, one or more vehicle sensors, or any other conceivable source. To cite a more particular example, if route information is being provided via an off-vehicle source, such as at server 82 at the call center 20, obtaining traffic information could be done at the server 82 and then downloaded to the vehicle 12 over a cellular data connection.

The traffic information may include traffic densities, which may, in some embodiments, be a color representation (e.g., green, yellow, or red) of light, moderate, and heavy traffic in particular lanes or on particular roadways or throughways. The traffic information may further include indication of one or more road hazards, which could be lane-specific. Road hazards may include accidents, objects on the road, construction, or any other hazard that may indicate there could be a traffic delay. Traffic information may also include data provided via a VSM 42, such as a vehicle-to-vehicle communication module, wherein the traffic information can include but is not limited to, speeds of vehicles in a particular vicinity, a determination of which lanes are moving faster based on relative speeds of other vehicles, etc. Traffic information could also include particular peak traffic hours (e.g., 7 AM to 9 AM and 4:30 PM to 6:30 PM). Other types of traffic information are certainly possible.

Additionally, the traffic information may be lane specific, route segment specific, or route specific, and may be updated in real-time. In one embodiment, traffic information is obtained for one or more route segments ahead of the vehicle 12 along the route. Also, traffic information may be obtained for one or more route segments ahead of the vehicle 12 for any possible alternative routes. In such a scenario, the method 300 may divert the vehicle 12 to an alternative route if the traffic information indicates that with the alternate route, the toll zone can be avoided without a traffic delay but there is could be a traffic delay for one or more of the route segments ahead of the vehicle 12 along the standard toll or non-toll route.

At step 330, the route may be generated based on the traffic information obtained in step 325. This step could involve generating an initial route for the vehicle 12, or it could represent generating an alternative route or altering an initially determined route. If, for one or more of the route segments ahead of the vehicle 12 which wholly or partially overlap the toll zone, the traffic information indicates that the toll zone can be avoided without a traffic delay, the route may be generated to avoid the toll zone. In another example, although a toll routes setting of the navigation unit 40 would normally route the vehicle 12 to the toll zone, the vehicle is directed to the corresponding non-toll zone when the traffic information of the route segment that wholly or partially overlaps the toll zone indicates that the toll zone can be avoided without a traffic delay. In a more particular embodiment, if the traffic information that is obtained includes lane-specific traffic information, and the toll zone is a toll lane and the non-toll zone is a non-toll lane, a route will be generated that directs the vehicle to the non-toll lane if there is no traffic delay. Accordingly, if traffic is lighter or the same when comparing the toll zone and the non-toll zone (or the route segment(s) containing the toll zone and the non-toll zone), a route will be generated that directs the vehicle 12 through the non-toll zone.

To determine if there is a traffic delay in the non-toll zone or the route segment containing the toll and non-toll zones, the traffic information is analyzed. If, for example, an indication of the traffic density signals light traffic (e.g., a green indication in a color-coded system), it can be determined that the toll zone can be avoided without a traffic delay. In another example, if input from a vehicle-to-vehicle communication module indicates that vehicles in the non-toll zone are moving at the same pace or faster than vehicles in the toll zone, it can be determined that the toll zone can be avoided without a traffic delay. In one embodiment, if vehicles in the non-toll zone are moving within 5 miles per hour of the speed limit, it may be determined that the toll zone can be avoided without a traffic delay. Additionally, if a vehicle-to-vehicle communication module, the navigation unit itself, or another VSM indicates there is a hazard in the toll zone, the vehicle may be routed to the non-toll zone. All of these exemplary determinations may be lane-specific.

In one embodiment, the route may be generated to direct the vehicle to the corresponding non-toll zone when the traffic information of the route segment that wholly or partially overlaps the toll zone indicates that a traffic level for the non-toll zone is comparable to a traffic level of the toll zone. To determine whether the traffic levels are comparable, they may both have the same traffic density indication (e.g., both the non-toll zone and the toll zone have a green indication in a color-coded system). In another example, the traffic levels may be comparable if no hazards are present in either the toll zone or the non-toll zone. In yet another example, the traffic levels may be comparable if the speed of vehicles in both the toll zone and the non-toll zone are within a threshold (e.g., within 10 miles per hour if the speed limit is about 65 miles per hour or within 5 miles per hour if the speed limit is below 65 miles per hour). Other examples are certainly possible.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of generating a navigation-based route for a vehicle, comprising the steps of:
   determining route information from a starting point to a destination using a navigation unit embedded in the vehicle, wherein the route information includes one or more route segments, wherein the navigation unit includes a user-configurable selection indicating that the route default to toll zones;
   determining that one or more of the route segments wholly or partially overlap a toll zone;
   obtaining traffic information for at least some of the route segments ahead of the vehicle;
   when the traffic information indicates that there is a route that avoids the toll zone without a traffic delay, then overriding the set user-configurable selection indicating that the route default to toll zones; and
   generating the route with the navigation unit to avoid the toll zone.

2. The method of claim 1, wherein the traffic information is specific to one or more of the route segments within the toll zone and to one or more of the route segments in a non-toll zone.

3. The method of claim 2, wherein the toll zone is a toll lane and the non-toll zone is a non-toll lane, and the generating step includes generating the route to direct the vehicle to the non-toll lane to avoid the toll zone when the traffic information indicates that the toll zone can be avoided without a traffic delay.

4. The method of claim 1, wherein the traffic information includes a traffic density indication, and the traffic information indicates that the toll zone can be avoided without a traffic delay when the traffic density indication represents light traffic.

5. The method of claim 4, wherein the traffic density information is a color-coded scheme and a color that represents light traffic densities indicates that the toll zone can be avoided without a traffic delay.

6. The method of claim 1, wherein the traffic information includes speeds of a plurality of vehicles in the route segments that wholly or partially overlap the toll zone, and the traffic information indicates that the toll zone can be avoided without a traffic delay if the speeds of the plurality of vehicles are comparable to a speed limit of a road in the route segments that wholly or partially overlap the toll zone.

7. The method of claim 1, wherein the traffic information includes relative speeds of a plurality of vehicles in a plurality of lanes in the route segments that wholly or partially overlap the toll zone, and the traffic information indicates that the toll zone can be avoided without a traffic delay if the relative speeds of the plurality of vehicles indicate that one or more of the plurality of lanes that represent the toll zone has traffic moving as fast or faster than traffic in one or more of the plurality of lanes that represent a corresponding non-toll zone.

8. The method of claim 1, wherein the traffic information includes an indication of one or more road hazards along the route, and the traffic information indicates there is a traffic delay if one or more of the road hazards are present at or before the one or more of the route segments ahead of the vehicle along the route which wholly or partially overlap the toll zone.

9. The method of claim 8, wherein the indication of one or more of the road hazards is lane specific, and the toll zone is a toll lane, and the generating step includes generating the route to include a non-toll lane when one or more of the road hazards are located in the toll lane.

10. The method of claim 1, wherein the step of obtaining traffic information includes obtaining traffic information for one or more of the route segments ahead of the vehicle for two or more possible alternative routes, and in one or more of the route segments ahead of the vehicle, when the traffic information indicates that the toll zone can be avoided without a traffic delay, generating an alternative route when the route segments ahead of the vehicle for the alternative route have less of a traffic delay than the routes including the toll zone and a corresponding non-toll zone.

11. The method of claim 1, wherein the starting point is a current position of the vehicle and the destination is a point ahead of the vehicle based on a current trajectory of the vehicle.

12. The method of claim 1, wherein the method includes updating traffic information for the route segment that wholly or partially overlaps the toll zone in real-time.

13. A method of generating a navigation-based route for a vehicle, comprising the steps of:
   determining route information at a navigation unit embedded in the vehicle, wherein the route information includes a route from a starting point to a destination divided into one or more route segments;
   determining whether to use toll routes via a user-configurable selection indicating that the route default to toll zones;
   when it is determined to use toll routes via the user-configurable selection, determining whether one or more of the route segments wholly or partially overlap a toll zone;
   when it is determined that one or more of the route segments wholly or partially overlap a toll zone, obtaining traffic information for the route segment that wholly or partially overlaps the toll zone and analyzing map data from the navigation unit to determine whether a corresponding non-toll zone is present;

when a corresponding non-toll zone is present, obtaining traffic information for one or more of the route segments that include the non-toll zone; and generating the route with the navigation unit to direct the vehicle to the corresponding non-toll zone when the traffic information of the route segment that wholly or partially overlaps the toll zone indicates that a traffic level for the non-toll zone is comparable to a traffic level for the toll zone, overriding the set user-configurable selection that the route default to toll zones.

14. The method of claim 13, wherein the step of obtaining traffic information for the route segment that wholly or partially overlaps the toll zone includes lane-specific traffic information.

15. The method of claim 14, wherein the toll zone is a toll lane and the non-toll zone is a non-toll lane, and the generating step includes generating the route to direct the vehicle to the non-toll lane.

16. The method of claim 13, wherein the step of analyzing the map data from the navigation unit includes receiving, or ascertaining that there is, an indicator of a toll lane and an indicator of a non-toll lane to determine whether a corresponding non-toll zone present.

17. The method of claim 16, wherein the generating step includes generating the route to include the non-toll lane when the traffic information of the route segment that wholly or partially overlaps the toll zone indicates that the toll zone can be avoided without a traffic delay.

18. A method of generating a navigation-based route for a vehicle, comprising the steps of:

determining route information at a navigation unit embedded in the vehicle, wherein the route information includes a route from a starting point to a destination divided into one or more route segments;

determining whether to use toll routes or to use non-toll routes via a user-configurable selection associated with the navigation unit;

when it is determined to use non-toll routes via the user-configurable selection, generating the route to direct the vehicle through a non-toll zone;

when it is determined to use toll routes via the user-configurable selection, determining whether one or more of the route segments wholly or partially overlap a toll zone;

when it is determined that one or more of the route segments wholly or partially overlap a toll zone, obtaining traffic information for the one or more of the route segments that wholly or partially overlap the toll zone and analyzing map data from the navigation unit to determine whether a corresponding non-toll zone is present;

when it is determined that a corresponding non-toll zone is present, obtaining traffic information for one or more of the route segments that include the non-toll zone and generating the route to direct the vehicle to the corresponding non-toll zone when the traffic information for the one or more of the route segments that include the non-toll zone and for the one or more of the route segments that wholly or partially overlap the toll zone indicate that the toll zone can be avoided without a traffic delay, and when the traffic information for the one or more of the route segments that include the non-toll zone and for the one or more of the route segments that wholly or partially overlap the toll zone indicate that avoiding the toll zone will incur a traffic delay, generating the route with the navigation unit to direct the vehicle to the toll zone, overriding the set user-configurable selection that the route default to toll zones; and when it is determined that a corresponding non-toll zone is not present, generating the route to direct the vehicle to the toll zone.

* * * * *